United States Patent [19]

Bergman et al.

[11] 4,376,556
[45] Mar. 15, 1983

[54] LINEAR BEARING ARRANGEMENT

[76] Inventors: Raymond A. Bergman, 107 E. Second St.; Donald J. Hemmelgarn, 123 N. Garfield, both of Minster, Ohio 45865

[21] Appl. No.: 183,019

[22] Filed: Sep. 2, 1980

[51] Int. Cl.$^3$ ............................................. F16C 29/06
[52] U.S. Cl. ...................................................... 308/6 C
[58] Field of Search ............... 308/3 A, 3.8, 3 C, 5 R, 308/ 6 R, 6 C, 9, 22

[56] References Cited

U.S. PATENT DOCUMENTS

| | | |
|---|---|---|
| 2,440,919 | 5/1948 | Shaw . |
| 3,272,570 | 9/1966 | Zenk .................................. 308/6 C |
| 3,301,611 | 1/1967 | Dunlap ............................... 308/6 C |
| 3,384,425 | 5/1968 | Brown . |
| 3,395,947 | 8/1968 | Brown . |
| 3,564,970 | 2/1971 | Larsen ........................... 308/6 C X |
| 3,608,985 | 9/1971 | Swanson .............................. 308/6 C |
| 3,619,013 | 11/1971 | Jones . |
| 3,658,393 | 4/1972 | Luthi . |
| 3,749,509 | 7/1973 | Lukoshnikov . |
| 3,772,961 | 11/1973 | Siebert . |
| 3,871,721 | 3/1975 | Siebert . |
| 3,951,471 | 4/1976 | Langenstein ......................... 308/6 C |
| 4,080,009 | 3/1978 | Marathe et al. . |
| 4,114,959 | 9/1978 | Christ . |

FOREIGN PATENT DOCUMENTS

601117  3/1978  U.S.S.R. ............................. 308/3 A

*Primary Examiner*—William D. Martin, Jr.

*Attorney, Agent, or Firm*—Gust, Irish, Jeffers & Hoffman

[57] ABSTRACT

A bearing arrangement for a wide variety of apparatus, such as machine tool tables, tool slides and carriages, wherein the bearing on one side of a movable element is preloaded by means of a hydraulic device forming a part of or connected to the opposing bearing on the other side of the movable element. A movable element, such as a machine tool table, is received in a support base having a lower guide surface and an upper guide surface. A roller-type bearing is secured to the table and bears against the guide surface which faces it, and, in this case, the last-mentioned guide surface is machined extremely flat and true relative to the tool. A second roller-type bearing is secured to the opposite side of the table and is urged against a guide surface by a hydraulic piston and cylinder. The hydraulic pressure which is developed presses the first roller bearing tightly against the respective guide surface and preloads the bearing so that the table will move with extreme accuracy relative to that surface. Since this surface is flat and true relative to the tool, the table will accordingly move with very high accuracy relative to the tool as well. The piston and cylinder develops a constant force due to the presence of a relief valve in the hydraulic supply line so that a constant preload of the bearing running against the true surface can be achieved. Because of the available stroke of the piston, parallelism of the two guide surfaces is no longer necessary. Only one true surface for each set of bearing pairs is necessary, thereby greatly simplifying machining and setup where extremely accurate linear movement is necessary.

24 Claims, 7 Drawing Figures

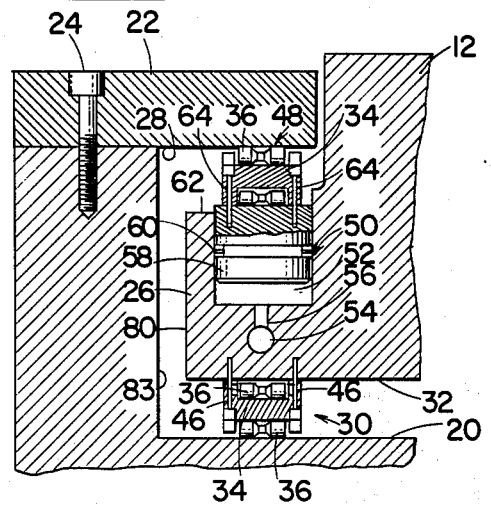
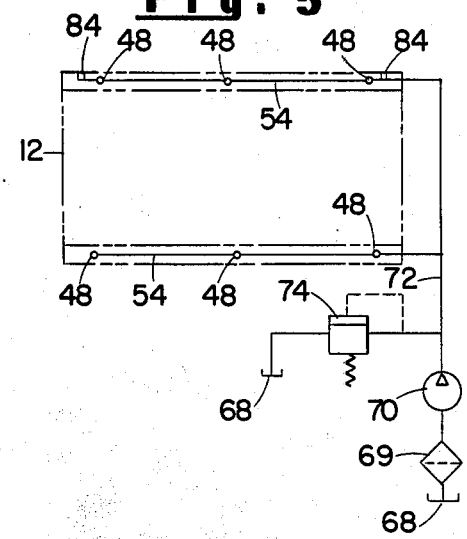
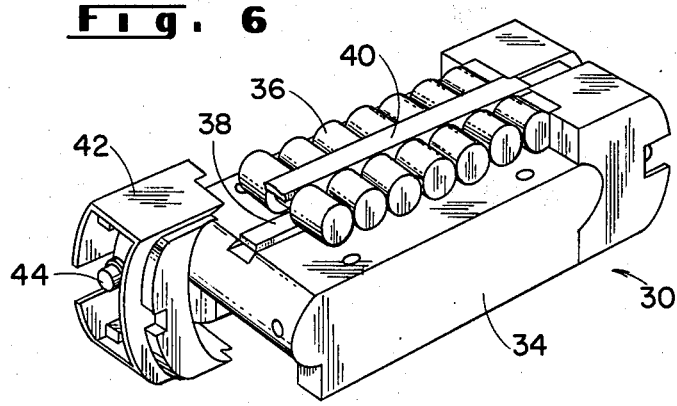
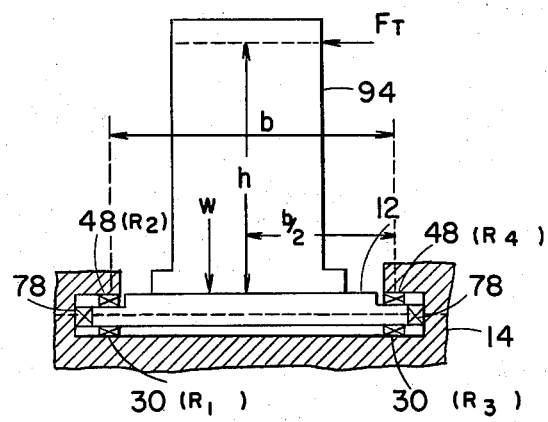

LINEAR BEARING ARRANGEMENT

BACKGROUND OF THE INVENTION

The present invention relates to bearing arrangements, particularly for apparatus utilized in machine tool and metal forming environments, such as machine tool slides, tables and carriages.

In machine tools, it is often necessary to traverse either a tool or a workpiece over fairly long linear distances during machining of the workpiece or between machining steps. For example, a workpiece may be rigidly secured to a machine tool table, and then the table traversed along a linear distance by means of a ball screw or the like to move the workpiece relative to a tool, such as a rotating milling cutter, which may cut a groove or chamfer in the workpiece. Conversely, the workpiece would be clamped to a stationary support and the tool moved relative to it during machining, as by a carriage or slide. In other machining operations, such as sequential hole boring, both the workpiece and tool carriage may remain stationary during machining, with a rotating bit moved into the workpiece by means of an axially movable spindle. In this case, the bit is withdrawn and then either the workpiece or tool moved to the next location for boring of the subsequent hole.

In each of the examples outlined above, it is important that the workpiece or tool be moved with extreme accuracy so that there is virtually no component of movement in directions perpendicular to the primary axis of movement. Obviously, a lack of stiffness in directions perpendicular to the primary direction of movement would result in non-linear machining in the case of the first two embodiments, and would result in improper relative placement of the bored holes in the case of the latter embodiment.

In the past, the table or carriage supporting the workpiece or tool was held in alignment by means of a V guide groove within which a correspondingly shaped ridge would be received, and the table prevented from skewing by virtue of the weight of the table forcing the complementary surfaces into mating engagement. In other cases, the table would be supported for movement by means of hydrostatic bearings mounted in either the table or support base, and which developed high pressure oil films to reduce the frictional drag between the table and support base.

Although such a table may have acceptable accuracy under static conditions, once a tilting force is applied to the table, as by high cutter force, the static weight of the table can be overcome by the moment arm of such force, thereby disrupting the accurate mating of the guiding surfaces.

Although hydrostatic bearings are very effective for reducing frictional drag between surfaces moving relative to each other, the effectiveness of the bearings are very sensitive to the clearance between the surfaces. When the clearance increases, the pressure of the hydraulic fluid necessarily decreases unless the overall hydraulic pressure and flow of the system is correspondingly increased. Furthermore, each time a different workpiece or tool weight is placed on the table or the force from a tool acting against the workpiece increases, the thickness of the oil film will change. If the oil film does change, then the tolerance is degraded by that amount. In other words, the oil film is dependent on a known preload under static conditions, and each time the preload changes, the thickness of the oil film will also change thereby increasing the tolerance of the apparatus.

Although very accurately machined guiding surfaces can be obtained for short traverse distances, the machining tolerance becomes much more difficult to obtain for very long traverse distances, such as distances of ten feet, for example. In the case where the movable element is sandwiched between two guiding surfaces, it is not only necessary for the surfaces themselves to be extremely flat, but they must be perfectly parallel to each other so that the clearance for the hydrostatic or antifriction bearings will be maintained constant. For long traverse distances, such parallelism is virtually impossible to obtain. The problem is further complicated by the necessity for constraining the movable element, such as a workpiece table, in two orthogonal directions. Here, two true, flat and parallel pairs of surfaces must be machined along the entire length of traverse of the table or carriage.

It is also known to support a movable element, such as press slide, between opposing pairs of hydrostatic bearings. Although this bearing arrangement resists, to some degree, lateral deflection of the movable element as it moves or reciprocates along its axis of movement, the hydraulic bearing clearance is disrupted by thermal expansion. Moreover, the proper clearance for the hydraulic film must be maintained on both sides of the movable element, and this requires extremely flat, true, and parallel opposing surfaces in the cases where high accuracy is required. As indicated earlier, maintaining such machining tolerances over long traverse distances is very difficult to achieve.

Preloaded hydrostatic bearings are also known, but the oil film left on the exposed ways in long traverse environments, attracts dirt and metal chips, thereby interferring with the accuracy of the guide surface.

Antifriction bearings, such as roller and ball bearings, can be utilized in bearing arrangements where very high accuracy is necessary, because they will deflect to a known degree with a certain known preload. The difficulty, however, is applying a preload to the bearings which is generally constant over the entire length of traverse of the table, carriage or other movable element. One prior art technique for preloading such bearings is to utilize a mechanical spring device, which applies a known amount of pressure to the bearing. The problem with such a device is that the preload applied by it is only correct for a given clearance, which may occur in only one position of the table or carriage. For example, if the opposing surfaces between which the table or carriage moves are non-parallel so that their separation differs from one position of the table or carriage to another, the spring device will be applying a different preload to the bearing. This is because of Hook's Law whereby the force exerted by a spring is proportional to its deflection.

One of the problems with hydrostatic bearings and other opposed bearing arrangements is the necessity for maintaining the parallelism of the surfaces against which the respective bearings bear within a relatively narrow range. If the surfaces are not parallel, the clearance for the hydrostatic bearing will increase or decrease as the movable element traverses thereby requiring a higher or lower hydraulic flow, respectively, to maintain the same preload on the other bearing. When the preload changes, the deflection of the antifriction bearing changes or the oil film of the hydrostatic bearing changes thereby changing the position of the movable element relative to the true surface, which defines the reference plane for that degree of freedom. The problem of maintaining parallelism between the two surfaces increases as the length of traverse of a movable element increases. For very long traverse distances, such as those of ten feet, for example, it is almost impossible to maintain surfaces which are always parallel.

SUMMARY OF THE INVENTION

In accordance with a preferred embodiment of the invention, the above problems are overcome by preloading one of the antifriction bearings forming the bearing pair with a constant force for a given static load. This is done by connecting the other antifriction bearing of the pair to an expansible chamber device, such as a piston and cylinder, whereby the latter bearing is urged against its guide surface with a predetermined degree of pressure. This, in turn, presses the movable element in the opposite direction with the same force so as to constantly preload the first-mentioned bearing. Parallelism of the guide surfaces is no longer necessary, because as the clearance between the bearing which is connected to the expansible chamber device increases due to divergence of the guiding surfaces or decreases due to convergence of the guiding surfaces, the expansible chamber device will expand or retract, but always at the same pressure, which is governed by a relief valve in the hydraulic supply for the device.

In the preferred embodiment, the expansible chamber device comprises a piston and cylinder, wherein either the piston or the cylinder is the movable element connected to the bearing.

It is preferred that, in the case of a workpiece table or tool carriage, that the bearings be secured to the movable element, which is the table or carriage, rather than to the stationary supports, which are the ways, support bed, etc. In this case, the expansible chamber device would be secured to or be part of the movable element, and the true surface would be that surface against which the bearing secured to the movable element bears.

The preload for the bearing preferably is selected so that it is sufficiently high to withstand the highest static or dynamic force which will be exerted against the bearing during use, and this force is determined by adjusting a relief valve connected to the hydraulic supply for the system. In the case of multiple bearing pairs, the simplest arrangement is to connect the expansible chamber devices in parallel with a common source of supply and a common relief valve.

The system is not limited to the movement of workpiece tables or tool carriages in machining environments, but is equally applicable to other apparatus, both in the machine tool environment and elsewhere, wherein extreme accuracy in movement or positioning is desirable.

Specifically, the preferred embodiment of the present invention contemplates a bearing arrangement comprising a first support element, a second support element spaced from and generally opposite the first element, and an intermediate element interposed between the first and second support elements and movable relative to the support elements. Either the first support element or the intermediate element has a first guide surface which faces the other of the first support element or intermediate element, and either the second support element or the intermediate element has a second guide surface which faces the other of the second support element or intermediate element. A first antifriction bearing means is connected to the other of the first support element and the intermediate element and is in movable engagement with the first guide surface in directions parallel thereto; a second antifriction bearing means is on the other of the second support element and the intermediate element and is in movable engagement with the second guide surface in directions parallel thereto. A preload device is provided for yieldably pressing the second bearing means and the second guide surface together, and includes an expansible chamber device connected to the second bearing means and the other of the second support element and the intermediate element such that expansion of the expansible chamber device presses the second bearing element and second guide surface together. Means are provided for supplying pressurized fluid to the expansible chamber device, preferably at the constant pressure.

In its most basic form, the bearing arrangement according to the present invention comprises a single pair of antifriction bearings, preferably acting along a line perpendicular to the axis of movement of the movable element. In order to support the movable element so that there is only one degree of freedom of movement, however, more than one pair of such bearings is necessary. For example, to support and guide a workpiece table, at least four pairs of bearings, two on each side of the table, and acting in the vertical direction, together with at least two pairs of bearings acting in the horizontal direction against the edges of the table, will be necessary. This arrangement requires three true surfaces, two in the horizontal plane, and one in the vertical plane. In order to accurately guide the press slide described above, four bearing pairs are preferred, two in respective parallel planes parallel to the axis of reciprocation of the slide, and two in respective parallel planes also parallel to the axis of reciprocation but orthogonal to the first-mentioned planes.

It is an object of the present invention to provide a bearing arrangement whereby a movable element, such as a table, slide, carriage, or the like, may be constrained in very accurate positions during movement with a minimum of accurately machined true and flat surfaces.

It is a further object of the present invention to provide a linear bearing arrangement wherein very accurate parallelism of opposed guide surfaces is not necessary, and wherein nonparallelism of such surfaces will not affect preloading of the bearings.

A still further object of the present invention is to provide a bearing arrangement wherein preloading of the bearings can be adjusted easily for different static and expected dynamic loads so as to minimize the effect of such loading on bearing deflection and, therefor, accuracy of movement.

A still further object of the present invention is to provide a bearing arrangement wherein bearings are preloaded by means of hydraulic pressure, but wherein the hydraulic fluid is confined in a closed system. Another object of the present invention is to provide a bearing arrangement wherein a machine tool table can be accurately guided without the necessity for relying on the static weight of the table as the sole means for alignment.

Another object of the present invention is to provide a bearing arrangement wherein the bearings self-adjust to compensate for thermal growth of the relatively movable elements caused by heat.

Yet another object of the present invention is to provide a bearing arrangement wherein a constant preload is maintained on one of the bearings without the need for a true and parallel backmounting surface.

Yet another object of the present invention is to provide a bearing arrangement wherein a damping effect opposing dynamic imbalances is achieved by means of the fluid in a hydraulic preload system.

These and other objects of the present invention will become apparent from the detailed description taken in conjunction with the drawings.

BRIEF DESCRIPTION OF THE DRAWINGS

FIG. 4 is an enlarged sectional view taken along line 6—6 of FIG. 1 and viewed in the direction of the arrows;

FIG. 5 is a schematic diagram of the hydraulic system;

FIG. 6 is an enlarged perspective view of the antifriction bearing; and

FIG. 7 is a diagram showing typical loading of a table.

DETAILED DESCRIPTION

Figure 1:
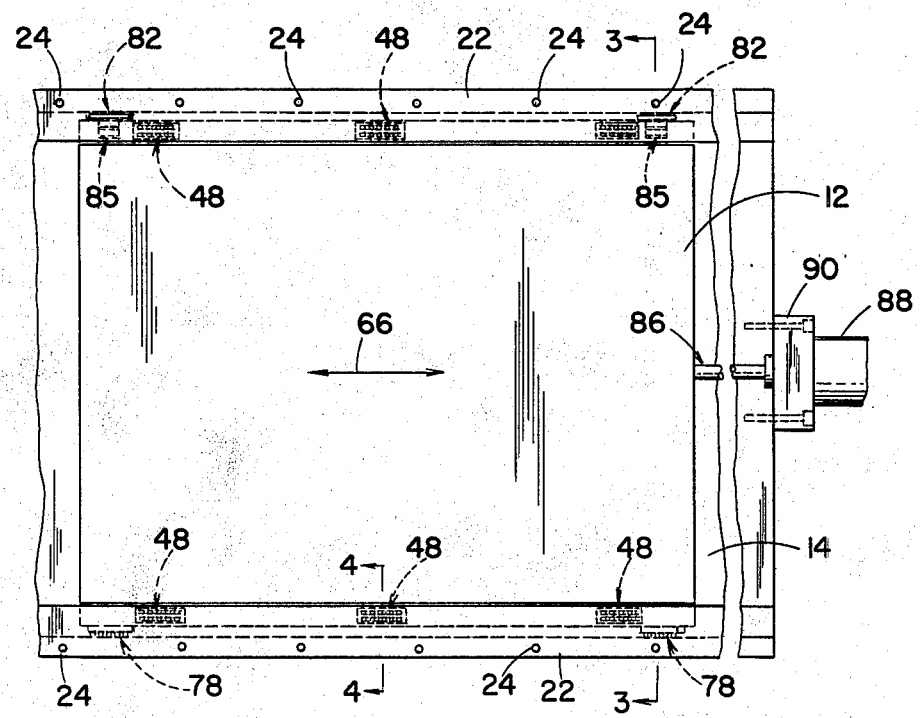
FIG. 1 is a plan view of a work supporting table incorporating the bearing arrangement of the present invention.

Referring now to the drawings, FIGS. 1, 2, 3 and 4 illustrate the preferred embodiment of the present invention. Although the bearing arrangement according to the invention can be utilized with a wide variety of apparatus wherein high accuracy is required, for purposes of description, it has been shown in conjunction with a work supporting table 12. Table 12 is customarily made of steel or cast iron and is adapted to have one or more workpieces (not shown) mounted to it during machining. If desired, table 12 could be an air float table of the type described in U.S. Pat. No. 4,174,828, wherein workpieces are supported on a cushion of air as they are moved from one location to another on the table and then subsequently clamped in place. This patent is incorporated by reference.

Table 12 is supported on a steel or cast iron base 14, which is in turn supported on a plurality of adjustable levelers 15. Levelers 15 are rigidly secured to or imbedded in a concrete foundation 16, and can be adjusted so as to ensure that base 14 is level and flat with a very high degree of accuracy. Levelers 15 are commercially available from Unisorb Machinery Installation Systems, for example. Supporting base 14 is provided with a pair of lower guide rails 18 having guide surfaces 20, which are machined extremely flat and true with very high accuracy. Levelers 15 can be adjusted to ensure the flatness of guide surfaces 20 and to ensure that these surfaces 20 run true to the machine tool spindle or cutting head (not shown).

A pair of upper guide rails 22 are secured to supporting base 14 by screws 24 such that they overlie the side flange portions 26 of table 12. Upper guide rails 22 include downwardly facing guide surfaces 28 which are machined flat and generally true to the tool spindle or cutter head as well as generally parallel to guide surfaces 20. As will become apparent, for the preferred embodiment illustrated in FIGS. 1, 2, 3 and 4, it is not essential that guide surfaces 28 be precisely true and parallel to lower guide surfaces 20, but it is preferable that they be generally true and flat and generally parallel to surfaces 20.

Six recirculating roller-type bearings 30 are secured to the lower surface 32 of table 12 immediately opposite the guide surfaces 20 of lower rails 18. Bearings 30, which are illustrated in detail in FIG. 6, are Bendix Scully-Jones Tychoway bearings available from Bendix Corporation. It should be noted, however, that the present application is not limited to the particular type of antifriction roller bearings described herein, and other suitable antifriction bearings, such as ball bearings and other types of roller bearings could be utilized equally well provided that they are capable of withstanding the preload which is developed. Each of the bearings 30 comprises a race 34 on which a plurality of rollers 36 roll in recirculating fashion around race 34 much like an endless track. Rollers 36 are guided by center guide 38 and stabilizer band 40; and end caps 42, secured to race 34 by screws 44, serve to contain the rollers 36 as they make the transition from one flat surface of the race 34 to the other.

As illustrated in FIG. 4, bearings 30 are secured to the lower surface 32 of table 12 by means of cap screws 46 in such a manner that table 12 is supported in the vertical direction on the rollers 36 of bearings 30. Due to the size of table 12, six such bearings 30 have been provided to evenly distribute the static and dynamic loads exerted by table 12. For larger tables, more than six bearings 30 may be necessary, whereas for smaller tables, only four such bearings 30 may be required to adequately support the load. For tables of this type, it is preferred that at least four such bearings be utilized.

In order to preload bearings 30 as taught by the present invention, there are provided six additional recirculating roller-type bearings 48, which are identical to bearings 30. Rather than being secured directly to table 12, they are connected to table 12 through an expansible chamber device 50, which is preferably a piston and cylinder unit. Expansible chamber device 50 comprises a cylinder 52 formed directly in the flange portions 26 of table 12 and provided with a substantially incompressible, hydraulic fluid through passages 54 and branch passages 56. Slidably received within cylinder 52 is a piston 58 having a seal 60 and protruding slightly above the upper surface 62 of flange portions 26. Upper bearings 48 are secured directly to pistons 58 by means of screws 64. It will be appreciated that upper bearings 48 are directly opposite lower bearings 30 along lines perpendicular to the horizontal plane or axis of movement of table 12 between guide surfaces 20 and 28.

The purpose of bearing pairs 30 and 48 is to virtually prevent any movement of table 12 in the vertical direction as it rolls along support base 14 in the directions indicated by arrows 66 (FIG. 1). Since lower guide surfaces 20 are flat and true relative to the machine tool spindle or cutter with a great degree of precision, if table 12 can always be located precisely relative to lower guide surfaces 20 then table 12 will always move true to the spindle or cutter. This is accomplished by admitting hydraulic fluid to cylinder 52 through passages 54 and 56 at a very high pressure sufficient to preload lower bearings 30 to a precisely known degree. Hydraulic fluid from sump 68 flows through filter 69 and is pumped by pump 70 through hydraulic line 72 and hydraulic passages 54, and from there through branch passages 56 into cylinders 52. As cylinders 52 is pressurized, pistons 58 will be driven upwardly so as to press upper bearings 48 against upper guide surfaces 28 under very high pressures. This, in turn, presses table 12 downwardly so as to press lower bearings 30 against lower guide surfaces 20, also at high pressures, so as to preload lower bearings 30. The amount of preload is maintained constant by providing a relief valve 74 connected in parallel with pump 70 so that it bypasses hydraulic fluid when its threshold pressure is reached. Thus, the hydraulic pressure in lines 72, 54 and 56 and, therefore, in cylinders 52 will always remain constant at the threshold pressure of relief valve 74. If desired, valve 74 could be of the adjustable type so that the preload could be varied for different load conditions of table 12.

A characteristic of bearings 30 is that they will always deflect by a known amount for a given degree of preload, so that if the pressure within cylinders 52 remains constant, then the preload on bearings 30 will also remain constant so that table 12 will always be spaced from lower guide surfaces 12 by a constant amount as it traverses along support base 14. It will be recalled that lower guide surfaces 20 are machined and adjusted so that they are precisely flat and true relative to the machine tool cutting element, and this ensures that table 12 will run true to the cutting element so long as the preload on lower bearings 30 remains constant. If desired, the bearing arrangement of FIG. 4 could be inverted with piston 58 connected to bearing 48 and surface 28 machined true and flat. In some cases, this arrangement is preferred.

The primary advantage of the described bearing arrangement is that it is not necessary for the upper guide surfaces 28 to be either flat or true to the machine tool cutting element or even parallel to lower guide surfaces 20. Assume, for example, that there is a localized low spot in one of the upper guide surfaces 28. With prior art bearing arrangements, looseness of table 12 would occur at this point because bearings 30 and 48 would not be preloaded to the same degree as before, and, in fact, upper bearings 48 may even move out of contact with the upper guide surface. With the present invention, on the other hand, the presence of pressurized hydraulic fluid within cylinder 52 will drive piston 58 and the upper bearing 48 attached thereto upwardly so that bearing 48 will continue to exert pressure against upper guide surface 28 with the same force as previously. This, in turn, maintains the preload on the corresponding lower bearing 30 at the same level as set. Conversely, if the upper bearing 48 meets with a high spot on upper guide surface 28, piston 58 will be driven downwardly against the constant pressure maintained within cylinder 52 and the same preload conditions for lower bearings 30 will be maintained.

For very long traverse distances of table 12 along its support ways, it is very difficult to maintain upper and lower guide surfaces 20 and 28 exactly parallel. With prior art bearings, looseness of the table would occur when guide surfaces 20 and 28 diverge thereby reducing the preload on lower bearings 30 so that table 12 is no longer the same distance from the lower guide surfaces 20, and is, therefore, no longer in the same spatial relationship with the cutting tool. With the bearing arrangement according to the present invention, however, as guide surfaces 20 and 28 diverge, pistons 58 will extend upper bearings 48 against the upper guide surfaces 28 so that the same degree of preload of lower bearings 30 will be maintained.

In order to prevent lateral movement of table 12, two antifriction bearings 78, which are identical to lower bearings 30, are secured to the side edges 80 of table 12 and bear against guide surface 83 of base 14. Directly opposite bearings 78 are mounted two antifriction bearings 82, which are identical to bearings 48 and are urged against the side guide surface 84 of support base 14 by piston and cylinder devices 85, which are identical to piston and cylinder devices 50. Cylinders 85 are connected to hydraulic passages 54 so that they are pressurized to the same level as cylinders 52. This preloads the opposite bearings 78 to a known constant level and ensures that table 12 is always spaced the same distance from guide surface 83. Guide surface 83 is machined precisely flat and true to the machine tool cutting element, so that table 12 will also run true to the element with a great degree of precision. As was the case with upper guide surfaces 28, it is not necessary for the other guide surface 84 opposing piston-mounted bearings 82 to be flat and true to the same degree as, nor parallel to, the opposite guide surface 83. The piston driven bearings 82 will compensate for high spots, low spots and nonparallelism so as to always press table 12 toward guide surface 83 with the same force. It is preferred that guide surface 83 be precisely perpendicular to lower guide surface 20 so as to maintain a proper orthogonal relationship between table 12 and support base 14.

Two pairs of bearings 78, 82 are provided and located approximately at the corners of table 12. Bearing 78 and 82 in each pair are directly opposite each other along lines perpendicular to the axis of movement of table 12.

With the arrangement described above, it will be appreciated that table 12 will always run at a constant distance from guide surfaces 20 and 83, and since these surfaces are true to the machine tool cutting element, table 12 will also run true to that element. Nonparallelism and unevenness in the opposing guide surfaces 84 and 28 is not crucial because the pistons 58 will always ensure a constant preload of bearings 30 and 78.

Table 12 can be moved along its rectilinear path by any suitable means, such as ball screw 86, which is driven by hydraulic motor 88 connected to it through gearing mechanism 90. Moreover, the exact same bearing arrangement could be utilized for a carriage (not shown) which carries a rotating spindle, boring tool, milling head, or the like.

Figure 2:
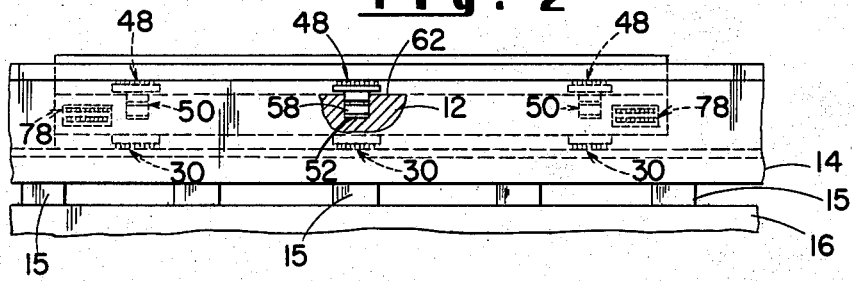
FIG. 2 is a side elevational view thereof with a portion broken away.
Figure 3:
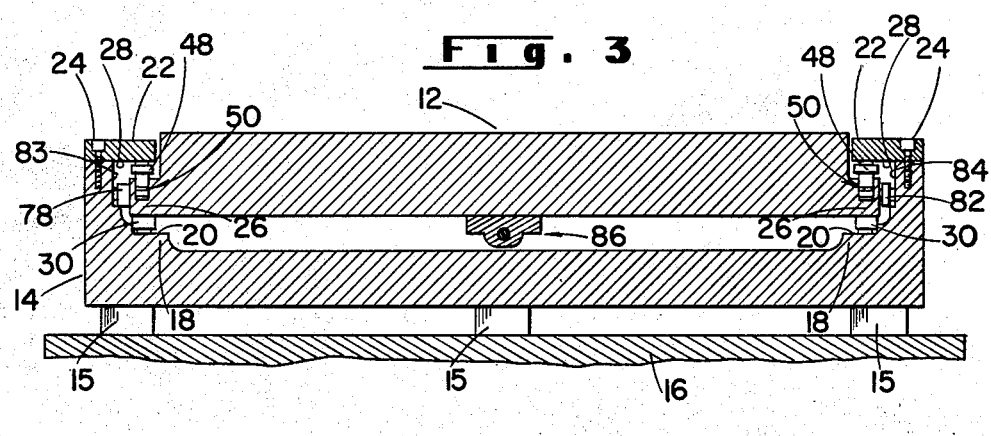
FIG. 3 is a sectional view along line 3—3 and viewed in the direction of the arrows.

The amount of preload which is selected depends to a great degree on the static and dynamic loads which the table 12 will exert during normal use. With reference to FIG. 7, a specific example of loading conditions for table 12 for a given workpiece and machining environment will be described. Table 12 is shown as having a workpiece 94 clamped thereto. Three sets of bearings 48, 78 and 30, each of which comprises six bearings as illustrated in FIGS. 1, 2 and 3 support table 12 within base 14. The following conditions are present:

| | |
|---|---|
| Total weight of table 12 and workpiece 94 | = 20,000 lb. |
| Thrust force of tool acting against workpiece 94 ($F_t$) | = 12,000 lb. |
| Vertical height from center line of table to plane of thrust force (h) | = 72 in. |
| Preload ($P_1$) on bearings R1 and R3 | = W/6 + 6000 = 9,330 lb. |
| Preload ($P_1$) on R2 and R4 | = 6,000 lb. |
| Static load capacity of each bearing (Tychoway 21200) | = 29,460 lb. |
| Deflection of bearing per 1,000 lb. | = .0001 in. |

In order to find the bearing reaction forces on bearing R4 for the given thrust force of the tool on workpiece 94, the moments at bearing R1 are summed:

$$R4 = \frac{Fth - Wb/2}{3b} = \frac{12,000 \times 72 - 20,000 \times 36}{3 \times 72} = 666 \text{ lb.}$$

This reaction force, which is less than the 6,000 pound preload per bearing, will cause a deflection of 0.000066 inches. The reaction forces on each bearing R1 are determined by summing the moments at the opposite bearing R4:

$$R1 = \frac{Fth}{3b} + \text{Preload} = \frac{12,000 \times 72}{3 \times 72} + 9330 = 13,330 \text{ lb.}$$

These reaction forces minus preload cause a table deflection of 0.000467 inches relative to the tool. The bearing deflection at bearings 30 and 48 will allow tool runout of 0.0000065 inches per inch.

Although the specific embodiments of the invention described above are directed to arrangements whereby a movable element, such as table 12 (FIG. 1) or slide 120 (FIG. 7) is received within and moved relative to stationary supports, the present invention is equally applicable to the converse arrangement wherein the enclosed element is secured to a stationary support and the enclosing elements move relative to it. Thus, for purposes of the present invention, the term movable refers to *relative* movement between two elements. In the case where the enclosed element is secured to a stationary support and the enclosing elements are movable relative to the stationary support, the enclosed element is nevertheless movable relative to the frame of reference of the enclosing elements. In this situation, then, the surface which is machined true and flat would be most likely located on the enclosed element, rather than on the enclosing elements as in the case of the specific embodiments shown and described.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A bearing arrangement comprising:
 a first support element,
 a second support element spaced from and generally opposite said first element,
 an intermediate element interposed between said first and second support elements and moveable relative to said support elements,
 one of said first support element and said intermediate element having a first guide surface facing the other of said first support element and said intermediate element, said first guide surface being formed to run extremely true to the desired path of movement of the intermediate element relative to the support elements, one of said second support element and said intermediate element having a second guide surface facing the other of said second support element and said intermediate element,
 a first antifriction bearing means comprising rotatable bearing elements connected to the other of said first support element and said intermediate element and in movable engagement with said first guide surface in directions parallel to said first guide surface,
 a second antifriction bearing means comprising rotatable bearing elements connected to the other of said second support element and said intermediate element and in movable engagement with said second guide surface in directions parallel to said second guide surface, and
 preload means on the opposite side of said intermediate element as said first guide surface for exerting pressure along a preload direction thereby yieldably pressing said second bearing means and said second guide surface together, said preload means including an expansible chamber device connected between said second bearing means and said the other of said second support element and said intermediate element such that expansion of the expansible chamber device presses said second bearing means and said second guide surface together thereby exerting a reaction force on said the other of said first support element and said intermediate element urging it toward the first guide surface, and means for supplying pressurized fluid to said expansible chamber device, said first bearing means being substantially immovably and non-yieldably supported by the other of said first support element and said intermediate element against movement relative thereto along the direction of the preload pressure when preload pressure is applied, there being preload means only on the side of said intermediate element opposite said true guide surface.

2. The bearing arrangement of claim 1 wherein said expansible chamber device comprises a piston and cylinder.

3. The bearing arrangement of claim 1 wherein said expansible chamber device comprises a cylinder connected to said intermediate element and a piston connected to said second bearing means and received in said cylinder.

4. The bearing arrangement of claim 3 wherein said cylinder is integral with said intermediate element.

5. The bearing arrangement of claim 1 wherein said expansible chamber device comprises a cylinder connected to said second bearing means and a piston connected to the other of said second support element and said intermediate element, said piston being received in said cylinder.

6. The bearing arrangement of claim 5 wherein said cylinder is integral with said second bearing means.

7. The bearing arrangement of claim 1 wherein said means for supplying pressurized fluid to said expansible chamber device comprises a fluid passage, a pump connected to the fluid passage, and a relief valve means connected to said fluid passage.

8. The bearing arrangement of claim 1 wherein said means for supplying pressurized fluid to said expansible chamber device includes means for ensuring a substantially constant fluid pressure in said expansible chamber device whereby there is substantially constant preloading of said first and second bearing means by said expansible chamber device.

9. The bearing arrangement of claim 1 wherein said first bearing means is a roller-type bearing having a plurality of rollers in rolling engagement with said first guide surface.

10. The bearing arrangement of claim 1 wherein said first bearing means is a roller-type bearing having a plurality of recirculating rollers in rolling engagement with said first guide surface.

11. The bearing arrangement of claim 1 wherein said first and second guide surfaces are on said first and second support elements, respectively, and said first bearing means and said second bearing means are secured to said intermediate element.

12. The bearing arrangement of claim 11 wherein said second support element is a horizontal support base, said first support element is a guide rail overlying said support base, and said first and second surfaces are horizontal and parallel to each other.

13. The bearing arrangement of claim 12 wherein said intermediate element is a table adapted for supporting workpieces or tools in a machine tool environment.

14. The bearing arrangement of claim 11 wherein said support elements are a horizontal support base connected to a stationary foundation, said first and second guide surfaces are horizontal and parallel to each other, said intermediate element is movable rectilinearly along an axis of movement, and said first and second bearing means are directly opposite each other along a line perpendicular to the axis of movement of said intermediate element.

15. The bearing arrangement of claim 14 including a plurality of said first bearing means and a plurality of said second bearing means, wherein said first and second bearing means are arranged in pairs with respective first bearing means being directly opposite respective second bearing means along respective lines perpendicular to the axis of movement of said intermediate element.

16. The bearing arrangement of claim 1 including:
a third support element,
a fourth support element spaced from and generally opposite said third element, said intermediate element being interposed between said third and fourth elements and movable relative to said third and fourth elements,
one of said third support element and said intermediate element having a third guide surface facing the other of said third support element and said intermediate element,
one of said fourth support element and said intermediate element having a fourth guide surface facing the other of said fourth support element and said intermediate element,
third antifriction bearing means connected to said the other of said third support element and said intermediate element and in movable engagement with said third guide surface in directions parallel to said third guide surface,
fourth antifriction bearing means connected to the other of said fourth support element and said intermediate element and in movable engagement with said fourth guide surface in directions parallel to said fourth guide surface, and
second preload means for yieldably pressing said fourth bearing means and said fourth guide surface together, said second preload means including a second expansible chamber device connected to said fourth bearing means and said the other of said fourth support element and said intermediate element such that expansion of said second expansible chamber device presses said fourth bearing means and said fourth guide surface together, and second means for supplying pressurized fluid to said second expansible chamber device.

17. The bearing arrangement of claim 16 wherein said first and second guide surfaces are parallel to each other, said second and fourth guide surfaces are parallel to each other, and said intermediate element is movable along an axis parallel to said first, second, third and fourth guide surfaces.

18. The bearing arrangement of claim 17 including a plurality of said first bearing means and a plurality of said second bearing means wherein said first and second bearing means are arranged in pairs with respective first bearing means directly opposite respective second bearing means along respective lines perpendicular to the axis of movement of said intermediate element, and further including a plurality of said third bearing means and a plurality of said fourth bearing means, wherein said third and fourth bearing means are arranged in pairs with respective said third bearing means being directly opposite respective fourth bearing means along respective lines perpendicular to the axis of movement of said intermediate element.

19. The bearing arrangement of claim 17 including:
a fifth support element,
a sixth support element spaced from and generally opposite said fifth element, said intermediate element being interposed between said fifth and sixth support elements and movable relative thereto,
one of said fifth support element and said intermediate element having a fifth guide surface facing the other of said fifth support element and said intermediate element,
one of said sixth support element and said intermediate element having a sixth guide surface facing the other of said sixth support element and said intermediate element,
fifth antifriction bearing means connected to said the other of said fifth support element and said intermediate element and in movable engagement with said fifth guide surface in directions parallel to said fifth guide surface,
sixth antifriction bearing means connected to said the other of said sixth support element and said movable element and in movable engagement with said sixth guide surface in directions parallel to said sixth guide surface, and
third preload means for yieldably pressing said sixth bearing means and said sixth guide surface together, said third preload means including a third expansible chamber device connected to said sixth bearing means and said the other of said sixth support element and said intermediate element such that the expansion of said third expansible chamber device presses said sixth bearing means and said sixth guide surface together, and third means for supplying pressurized fluid to said third expansible chamber device.

20. The bearing arrangement of claim 19 wherein said guide surfaces are planar, said first and fifth guide surfaces are coplanar and said second and sixth guide surfaces are coplanar, and the planes of said first, fifth, second and sixth guide surfaces are perpendicular to the planes of said third and fourth guide surfaces.

21. The bearing arrangement of claim 20 wherein said second, third, fourth and sixth support elements are part of a horizontal support base, said first and fifth support elements are guide rails, and said intermediate element is a machine tool table.

22. The bearing arrangement of claim 1 wherein said first bearing means is antifriction bearing having a plurality of rotatable elements in rolling contact with said first guide surface.

23. The bearing arrangement of claim 22 wherein said second bearing means is an antifriction bearing having a plurality of rotatable elements in rolling contact with said second guide surface, and said expansible chamber device comprises a piston and cylinder means connected to said second mentioned antifriction bearing.

24. The bearing arrangement of claim 23 wherein said antifriction bearings are connected to said intermediate element, and said first and second guide surfaces are on said first and second support elements, respectively.

* * * * *